(12) United States Patent
Immerman et al.

(10) Patent No.: US 9,550,695 B2
(45) Date of Patent: Jan. 24, 2017

(54) METHOD AND SYSTEM FOR FORMING SHAPED GLASS ARTICLES

(71) Applicant: CORNING INCORPORATED, Corning, NY (US)

(72) Inventors: Jacob Immerman, Elmira, NY (US); Thomas A. Keebler, Corning, NY (US); John Robert Saltzer, Jr., Beaver Dams, NY (US); Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 152 days.

(21) Appl. No.: 14/183,938

(22) Filed: Feb. 19, 2014

(65) Prior Publication Data

US 2014/0234581 A1 Aug. 21, 2014

Related U.S. Application Data

(60) Provisional application No. 61/766,878, filed on Feb. 20, 2013.

(51) Int. Cl.
   *C03B 23/023* (2006.01)
   *G06F 1/16* (2006.01)
   *C03B 23/035* (2006.01)

(52) U.S. Cl.
   CPC ....... *C03B 23/0235* (2013.01); *C03B 23/0357* (2013.01); *G06F 1/1626* (2013.01); *C03B 2225/02* (2013.01); *Y02P 40/57* (2015.11); *Y10T 428/24355* (2015.01); *Y10T 428/24628* (2015.01)

(58) Field of Classification Search
   CPC ............. C03B 23/0235; C03B 23/0256; C03B 23/0258
   See application file for complete search history.

(56) References Cited

U.S. PATENT DOCUMENTS

| | | | |
|---|---|---|---|
| 2,817,928 A | 12/1957 | Lambert et al. | |
| 4,483,700 A | 11/1984 | Forker, Jr. et al. | ........ 65/30.14 |
| 5,021,075 A | 6/1991 | Vanaschen et al. | |

(Continued)

FOREIGN PATENT DOCUMENTS

| | | |
|---|---|---|
| JP | 61227931 A | * 10/1986 |
| JP | 61227932 A | * 10/1986 |

(Continued)

OTHER PUBLICATIONS

English language translation of JP 61-227931.*

(Continued)

*Primary Examiner* — Jason L Lazorcik
(74) *Attorney, Agent, or Firm* — John T. Haran

(57) ABSTRACT

A method of forming a shaped glass article includes placing a glass sheet on a mold such that a first glass area of the glass sheet corresponds to a first mold surface area of the mold and a second glass area of the glass sheet corresponds to a second mold surface area of the mold. The first glass area and the second glass area are heated such that the viscosity of the second glass area is 8 poise or more lower than the viscosity of the first glass area. A force is applied to the glass sheet to conform the glass sheet to the mold surface. During the heating of the second glass area, the first mold surface area is locally cooled to induce a thermal gradient on the mold.

10 Claims, 11 Drawing Sheets

(56) References Cited

U.S. PATENT DOCUMENTS

| | | | |
|---|---|---|---|
| 5,053,069 A | 10/1991 | Vanaschen et al. | |
| 5,176,733 A * | 1/1993 | Koss | C03B 23/0258 65/107 |
| 5,183,491 A | 2/1993 | D'Iribarne et al. | |
| 5,674,790 A | 10/1997 | Araujo | 501/66 |
| 7,666,511 B2 | 2/2010 | Ellison et al. | 428/426 |
| 8,158,543 B2 | 4/2012 | Dejneka et al. | 501/68 |
| 2004/0206123 A1* | 10/2004 | Fotheringham | C03B 23/0258 65/103 |
| 2011/0067450 A1* | 3/2011 | Fredholm | C03B 21/02 65/81 |
| 2011/0126588 A1* | 6/2011 | Malach | C03B 23/0252 65/30.1 |
| 2011/0205485 A1* | 8/2011 | Sonzogni | B29C 43/3642 351/124 |
| 2012/0216573 A1* | 8/2012 | Dannoux | C03B 23/0258 65/104 |
| 2012/0279257 A1* | 11/2012 | Dannoux | C03B 23/0256 65/103 |
| 2012/0291490 A1* | 11/2012 | Yamakawa | C03B 23/0258 65/29.19 |
| 2012/0297828 A1* | 11/2012 | Bailey | C03B 23/0235 65/29.18 |
| 2013/0004758 A1 | 1/2013 | Dejneka et al. | 428/220 |
| 2013/0125588 A1* | 5/2013 | Kladias | C03B 23/0258 65/103 |
| 2013/0298608 A1* | 11/2013 | Langsdorf | C03B 23/0258 65/103 |
| 2013/0337224 A1* | 12/2013 | Odani | G06F 1/1626 428/130 |
| 2014/0157828 A1* | 6/2014 | Dannoux | C03B 35/14 65/103 |
| 2014/0162029 A1* | 6/2014 | Takeuchi | C03B 23/0235 428/174 |
| 2015/0040612 A1* | 2/2015 | Afzal | C03B 23/0357 65/32.1 |
| 2015/0047393 A1* | 2/2015 | Luo | C03C 21/002 65/30.14 |
| 2015/0114042 A1* | 4/2015 | Gaylo | C03B 23/0086 65/29.1 |
| 2015/0175468 A1* | 6/2015 | Sheehan | C03B 23/0235 65/172 |
| 2015/0274570 A1* | 10/2015 | Wada | C03B 40/005 65/106 |
| 2015/0329402 A1* | 11/2015 | Afzal | C03B 23/0235 65/348 |

FOREIGN PATENT DOCUMENTS

| | | | |
|---|---|---|---|
| JP | 62212237 A | * | 9/1987 |
| JP | 01122931 A | * | 5/1989 |
| WO | 2010/064083 | | 6/2010 |
| WO | 2012/118612 | | 9/2012 |

OTHER PUBLICATIONS

English language translation of JP 61-212237.*
English language translation of JP 61-227932.*
Patent Cooperation Treaty International Notification of Transmittal of the International Search Report and The Written Opinion of the International Searching Authority, international application No. PCT/US2014/016172; mailing date Apr. 29, 2014, 15 pages.

* cited by examiner

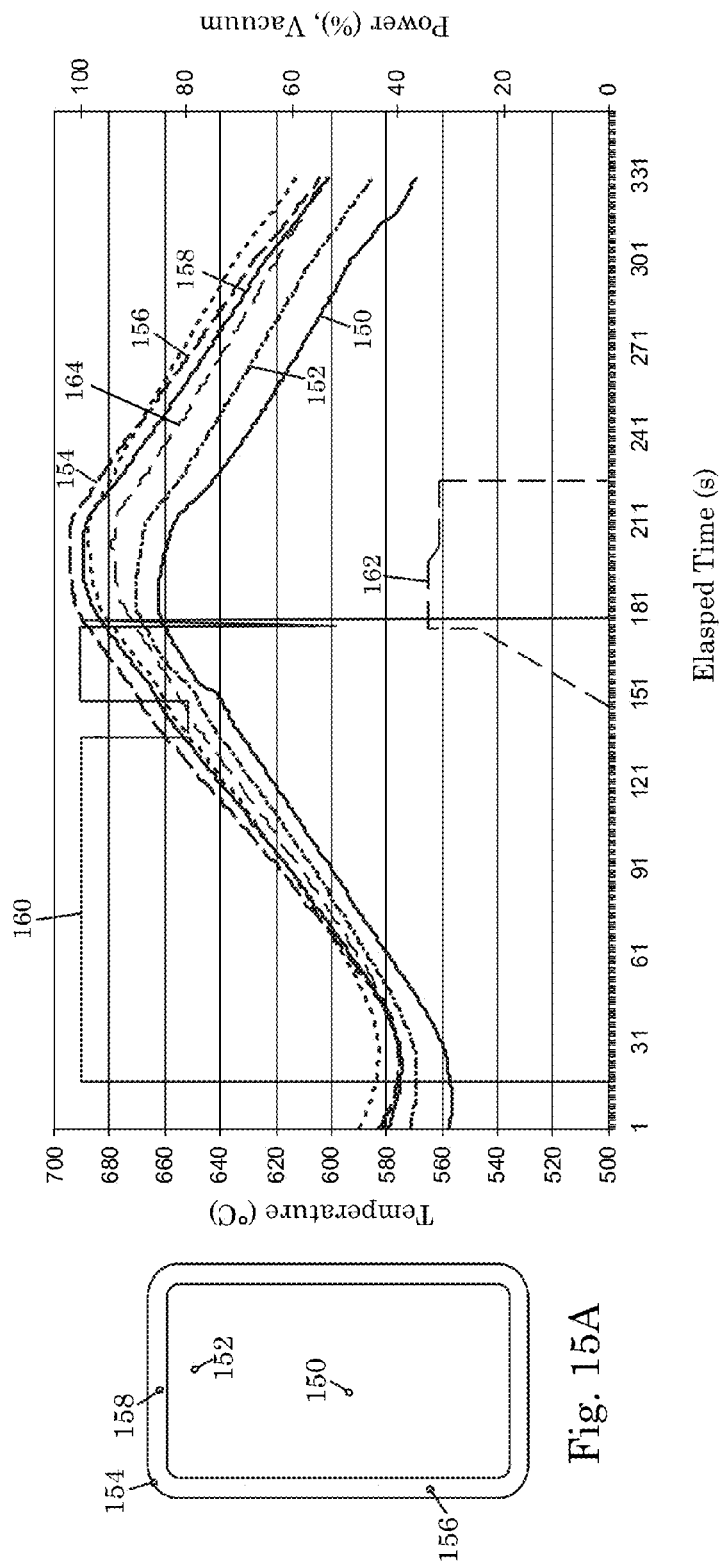

METHOD AND SYSTEM FOR FORMING SHAPED GLASS ARTICLES

This application claims the benefit of priority under 35 U.S.C. §119 of U.S. Provisional Application Ser. No. 61/766,878 filed on Feb. 20, 2013 the content of which is relied upon and incorporated herein by reference in its entirety.

FIELD

The present disclosure relates to production of shaped glass articles usable as cover glass for electronic devices.

BACKGROUND ART

Industrial design is driving demand for shaped cover glass for portable electronic devices such as smart phones and tablets. A typical shaped cover glass of interest has a combination of a large flat section for covering the front side of the electronic device and one or more curved sections for wrapping around one or more edges of the electronic device. The curved sections include bends and corners where they intersect with the flat sections. A flat electronic device will require a small bend radius, e.g., less than 20 mm, to allow the curved section to wrap around an edge of the device while maintaining the flat appearance of the device.

Shaped glass articles with small radius bends and corners are difficult and expensive to make using glass machining. Glass machining involves large material removal, which greatly increases cost. Total removal of machining marks with polishing is difficult to impossible. It is also very difficult to achieve an even polish on curved sections without inducing optical distortions in the glass article.

Thermal reforming with molds can avoid some of the challenges inherent in glass machining. However, there are also challenges with precision forming of small radius bends and corners with this approach, especially when the glass has a high softening point and requires relatively high temperatures to form the bends and corners. At high forming temperatures, interaction between the glass and mold becomes a concern.

SUMMARY

When forming a shaped glass article using thermal reforming and a mold, the flat and curved areas of the glass sheet are normally heated and force is normally applied to both the flat and curved areas in order to conform the flat and curved areas of the glass sheet to the flat and curved areas of the mold. To form a bend with a small radius, e.g., less than 20 mm, without inducing high stress in the glass sheet, the glass viscosity needs to be at or below $10^{9.9}$ poise when the force is applied to the glass sheet.

Normally, the glass sheet will not fully contact the bends and corners in the mold until near the end of applying the force. If the mold is a female mold, the flat area of the glass sheet will sag freely into the mold cavity during the early stages of the heating and contact the flat area of the mold. Thus the flat area of the glass sheet will have a much longer interaction time with the mold than the bend area of the glass sheet. In the case of a male mold, the flat area of the glass sheet will be in contact with the flat area of the mold during the entire heating cycle.

If the flat area of the glass sheet is below $10^{9.9}$ poise or the flat area of the mold is at the same temperature as the bend area of the mold during the long contact between the flat area of the glass sheet and the flat area of the mold, the glass surface may have undesirable pitting and staining in the flat area due to interaction with the mold. The mold life will also be shortened if the glass is in contact with the mold at a relatively high temperature for a relatively long period.

According to the present disclosure, it is desirable to keep the flat area of the mold colder than the bend area of the mold during the bend forming process. It is also desirable to get the glass sheet and mold locally hot in the bend area so that bends and corners can be precisely formed in the glass sheet. It is further desirable to keep the glass sheet and mold relatively cold in the flat area while the glass sheet and mold are hot in the bend area so that undesirable pitting and staining in the flat area of the glass surface can be avoided.

In one aspect, a method of forming a shaped glass article comprises placing a glass sheet on a mold having a mold surface with a select shaped glass article profile. The placing is such that a first glass area of the glass sheet corresponds to a first mold surface area of the mold surface and a second glass area of the glass sheet corresponds to a second mold surface area of the mold surface. The first glass area and second glass area are heated to a glass viscosity between $10^{10.1}$ poise and $10^9$ poise. Then, the second glass area is locally heated to a glass viscosity at or below $10^{9.9}$ poise, so that the glass viscosity in the second glass area is 8 poise or more lower than the viscosity in the first glass area. When the second glass area is at a glass viscosity at or below $10^{9.9}$ poise, force is applied to the glass sheet to conform the glass sheet to the mold surface. During local heating of the second glass area, the first mold surface area is locally cooled to induce a thermal gradient on the mold surface that results in the glass viscosity in the first glass area remaining above $10^{9.9}$ poise.

In one embodiment, the local cooling of the first mold surface area is such that the glass viscosity in the first glass area is maintained at or above $10^{10.9}$ poise during at least a portion of the local heating of the second glass area.

In one embodiment, the local cooling of the first mold surface area results in a maximum thermal gradient across the first mold surface area of less than 20° C. during the local cooling.

In one embodiment, the local cooling of the first mold surface area is such that a temperature of the first mold surface area is below a temperature corresponding to a glass viscosity of $10^{11.3}$ poise.

In one embodiment, a temperature of the second mold surface area is above a temperature corresponding to a glass viscosity of $10^{11.7}$ poise when the force is applied to the glass sheet.

In one embodiment, the first mold surface area is substantially flat and the second mold surface area comprises a bend having a radius less than 20 mm.

In one embodiment, the force is applied to the glass sheet by creating vacuum at the second glass area through at least one vacuum opening located in the bend.

In one embodiment, creating vacuum includes creating vacuum with a first vacuum pressure for a first time period followed by creating vacuum with a second vacuum pressure for a second time period, wherein the second vacuum pressure is reduced compared to the first vacuum pressure.

In one embodiment, the method further includes cooling the conformed glass sheet to a glass viscosity above $10^{13}$ poise.

In another aspect, a system for forming a shaped glass article comprises a mold having a first mold surface area and a second mold surface area. The first mold surface area includes a substantially flat area and the second mold surface area includes at least one bend and at least one opening. The system further includes a cooling device coupled to the mold and configured for active cooling of the first mold surface area. The system also includes a vacuum plenum coupled to the mold and in communication with the second mold surface area through the at least one opening. The system includes a heater assembly arranged opposite to the second mold surface area to provide localized heat to the second mold surface area.

In one embodiment, the system further includes a furnace, wherein the mold, cooling device, vacuum plenum, and heater assembly are arranged in the furnace.

In one embodiment, the at least one opening is located in the at least one bend.

In one embodiment, the at least one bend has a radius less than 20 mm.

In one embodiment, the heater assembly includes at least one radiant heater having a heater temperature in a range from 1000° C. to 1450° C.

In one embodiment, the heater assembly includes at least one radiant heater having a peak wavelength in a range from 2.0 µm to 2.7 µm.

In one embodiment, the heater assembly includes a loop arrangement of heaters.

In one embodiment, the heater assembly includes a parallel arrangement of heaters.

In one embodiment, the heater assembly includes at least one radiant heater and a reflector arranged to focus heat from the at least one radiant heater to the second mold surface area.

In another aspect, a shaped glass article having an optical quality surface area suitable for an electronic device cover glass is formed by the method described above.

In another aspect, a shaped glass article comprises a glass body having a three-dimensional shape, wherein at least one surface of the glass body has a waviness height less than 30 nm over a 15 mm by 25 mm measurement area and a roughness average less than 1 nm.

In one embodiment, the glass body has a flat area that is flat to within 100 µm over a measurement area of 25 mm×25 mm.

In one embodiment, the glass body has at least one bend area with a bend radius of less than 10 mm.

In one embodiment, the glass body has an optical transmission greater than 85% in a wavelength range of 400 nm to 800 nm.

In one embodiment, the glass body has a compression strength greater than 300 MPa.

In one embodiment, the glass body has a hardness of greater than 7 on the Mohs scale.

In one embodiment, the glass body is made of an alkali aluminosilicate glass.

In one embodiment, the glass body is adapted for covering an electronic device having a flat display.

It is to be understood that both the foregoing general description and the following detailed description are exemplary and are intended to provide an overview or framework for understanding the nature and character of the embodiments. The accompanying drawings are included to provide a further understanding and are incorporated in and constitute a part of this specification. The drawings illustrate various embodiments and together with the description serve to explain the principles described herein.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

FIG. 15A shows various monitored points on a mold surface.
FIG. 15B shows thermal profiles corresponding to the monitored points in FIG. 15A.

DETAILED DESCRIPTION OF EMBODIMENTS

Figure 1:
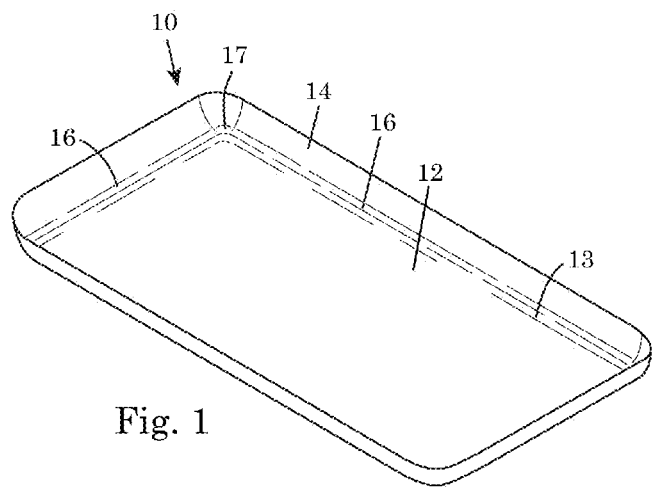
FIG. 1 shows a dish-shaped glass article.

In the following detailed description, numerous specific details may be set forth in order to provide a thorough understanding of embodiments. However, it will be clear to one skilled in the art when embodiments may be practiced without some or all of these specific details. In other instances, well-known features or processes may not be described in detail so as not to unnecessarily obscure the description. In addition, like or identical reference numerals may be used to identify common or similar elements.

FIG. 1 shows a shaped glass article 10 having a glass article flat section 12 and a glass article curved section 14. When used to describe the shape of a glass article or mold, the term "flat" will cover both perfectly flat, i.e., having a radius of curvature of infinity, and substantially flat, i.e., having a radius of curvature greater than 300 mm. The glass article curved section 14 runs around the periphery 13 of the glass article flat section 12 and is contiguous with the glass article flat section 12. The glass article curved section 14 includes bends 16 and corners 17 where it intersects with the glass article flat section 12, giving the glass article 10 a dish shape. In particular embodiments, the wall thickness of the shaped glass article 10 is uniform. Typically, the wall thickness will be 1.5 mm or less. The shaped glass article 10, with the appropriate dimensions, can be used as a cover glass for a portable electronic device, where the glass article flat section 12 will cover a flat side of the electronic device and the glass article curved section 14 will wrap around the edges and corners of the electronic device.

Figure 2:
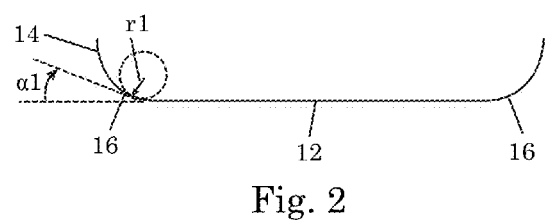
FIG. 2 is a profile of the glass article of FIG. 1.

Each bend 16 has a bend angle α1 and a bend radius r1. As shown in FIG. 2, the bend angle α1 is the outer angle of the bend 16 measured relative to the plane of the glass article flat section 12, and the bend radius r1 is the local radius of curvature measured inside the bend 16. The bend radius r1 may or may not be constant along the bend 16, hence use of the term "local" with "radius of curvature." In some embodiments, the bend angle α1 is in a range from greater than 0° to 90°. If α1 is close to 0°, the glass article curved section 14 will be nearly parallel to the glass article flat section 12. If α1 is close to 90°, the glass article curved section 14 will be nearly perpendicular to the glass article flat section 12. In some particular embodiments, the bend angle α1 is in a range from 30° to 90°. The bend radius r1 will generally be small to allow snug fitting of the shaped glass article around the edges and corners of the electronic device or other object to be covered. In one embodiment, the bend radius r1 is less than 20 mm. In another embodiment, the bend radius r1 is less than 15 mm. In yet another embodiment, the bend radius r1 is less than 10 mm.

Figure 3:
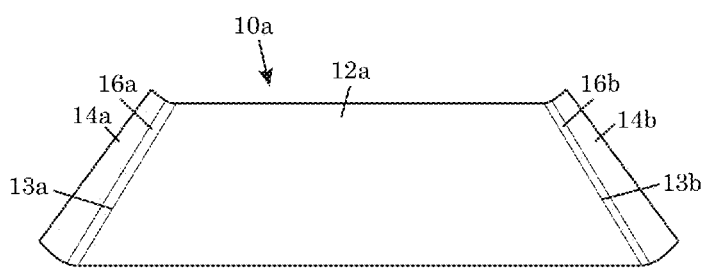
FIG. 3 shows a sled-shaped glass article.

FIG. 3 shows a shaped glass article 10*a* having a glass article flat section 12*a* and glass article curved sections 14*a*, 14*b*. The term "flat" is as explained above. The glass article curved sections 14*a*, 14*b* run along the opposite edges 13*a*, 13*b* of the glass article flat section 12*a* and are contiguous with these edges. The glass article curved sections 14*a*, 14*b* include bends 16*a*, 16*b* where they intersect the glass article flat section 12*a*, giving the glass article 10*a* a sled shape. Typically, the glass article flat section 12*a* and glass article curved sections 14*a*, 14*b* will have the same wall thickness so that the thickness of the shaped glass article 10*a* is uniform. Typically, this wall thickness will be 1.5 mm or less. The shaped glass article 10*a*, with the appropriate dimensions, can be used as a cover glass for a portable electronic device, where the glass article flat section 12*a* will cover a flat side of the electronic device and the glass article curved sections 14*a*, 14*b* will wrap around opposite edges of the electronic device.

Figure 4:
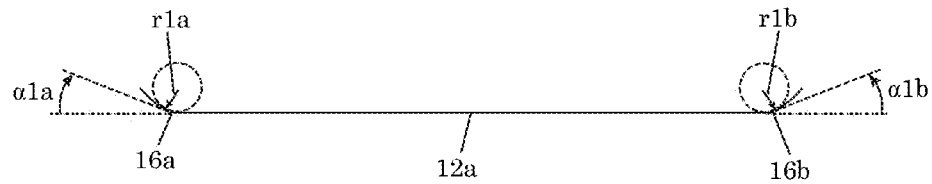
FIG. 4 is a profile of the glass article of FIG. 3.

The bends 16*a*, 16*b* have bend angles α1*a*, α1*b* and bend radiuses r1*a*, r1*b*, respectively. As shown in FIG. 4, the bend angle α1*a* is the outer angle of the bend 16*a* measured relative to the plane of the glass article flat section 12*a*, and the bend radius r1*a* is the local radius of curvature measured inside the bend 16*a*. Similarly, the bend angle α1*b* is the outer angle of the bend 16*b* measured relative to the plane of the glass article flat section 12*a*, and the bend radius r1*b* is the local radius of curvature measured inside the bend 16*b*. The bend angles α1*a*, α1*b* may be the same or different. Similarly, the bend radiuses r1*a*, r1*b* may be the same or different. In some embodiments, each of the bend angles α1*a*, α1*b* is in a range from greater than 0° to 90°. In some particular embodiments, each of the bend angles α1*a*, α1*b* is in a range from 30° to 90°. The bend radiuses r1*a*, r1*b* will generally be small to allow snug fitting of the shaped glass article around the edges and corners of the electronic device or other object to be covered. In one embodiment, each of the bend radiuses r1*a*, r1*b* is less than 20 mm. In another embodiment, each of the bend radiuses r1*a*, r1*b* is less than 15 mm. In yet another embodiment, each of the bend radiuses r1*a*, r1*b* is less than 10 mm.

A shaped glass article, e.g., 10 in FIG. 1 or 10*a* in FIG. 3, having an optical surface area suitable for electronic device cover glass can be formed from a flat glass sheet using thermal reforming and a mold having a mold surface with the necessary shape profile. The glass sheet can be made of any suitable glass composition. In particular embodiments, the glass sheet is an ion-exchangeable glass, typically containing relatively small alkali metal or alkaline-earth metal ions that can be exchanged for relatively large alkali or alkaline-earth metal ions. Examples of ion-exchangeable glasses can be found in the patent literature, e.g., U.S. Pat. No. 7,666,511 (Ellison et al; 23 Feb. 2010), U.S. Pat. No. 4,483,700 (Forker, Jr. et al.; 20 Nov. 1984), and U.S. Pat. No. 5,674,790 (Araujo; 7 Oct. 1997), all incorporated by reference in their entireties, and are also available from Corning Incorporated under the trade name GORILLA® glass. Typically, these ion-exchangeable glasses are alkali-aluminosilicate glasses or alkali-aluminoborosilicate glasses. The ion-exchangeable glass will allow chemical strengthening of the shaped glass article by ion-exchange after the forming process.

Figure 5:
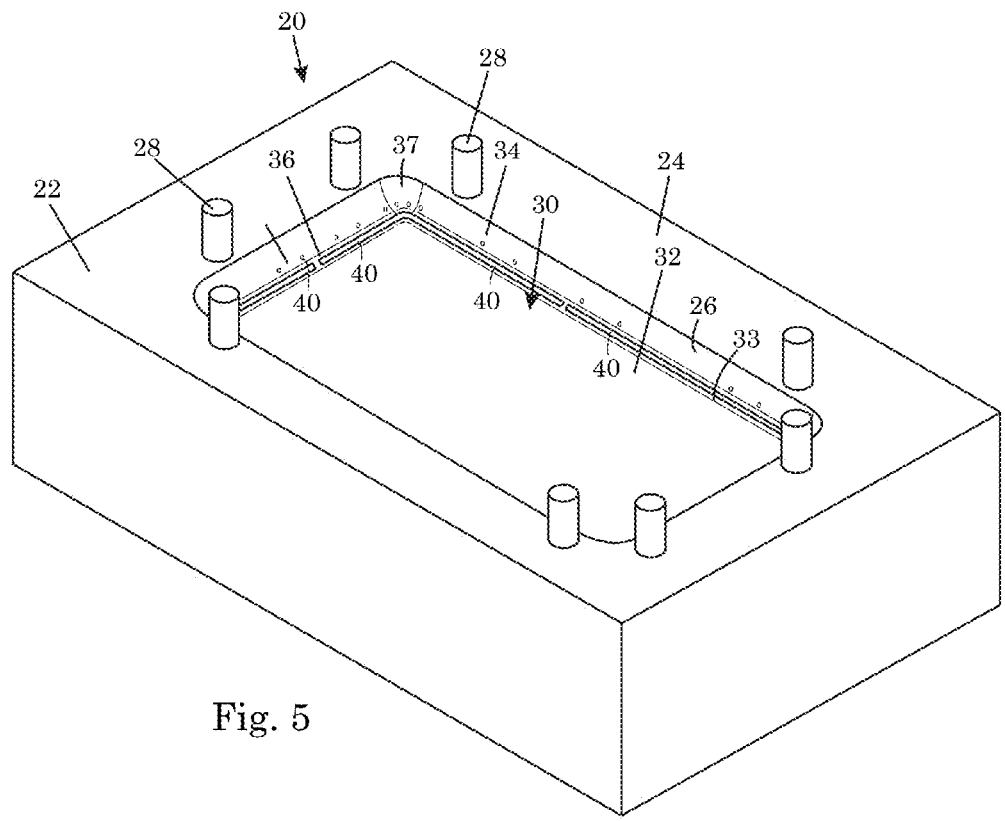
FIG. 5 shows a mold for forming the glass article of FIG. 1.

FIG. 5 shows a mold 20 for forming the shaped glass article 10 (in FIG. 1). The mold 20 has a mold body 22 with an upper surface 24. A mold surface 30 extending below the upper surface 24 defines a mold cavity 26 within the mold body 22. Alignment pins 28 on the upper surface 24 are for precisely locating a glass sheet on the mold 20, or above the mold cavity 26. The mold surface 30 has a mold surface flat area 32 for forming the glass article flat section 12 (in FIG. 1) and a mold surface curved area 34 for forming the glass article curved section 14 (in FIG. 1). The mold surface curved area 34 runs around the periphery 33 of the mold surface flat area 32 and includes bends 36 and corners 37 where it intersects the mold surface flat area 32. The characteristics of the bends 36 and corners 37 will be dictated by the shaped glass article 10 or any other article to be formed by the mold 20.

Figure 6:
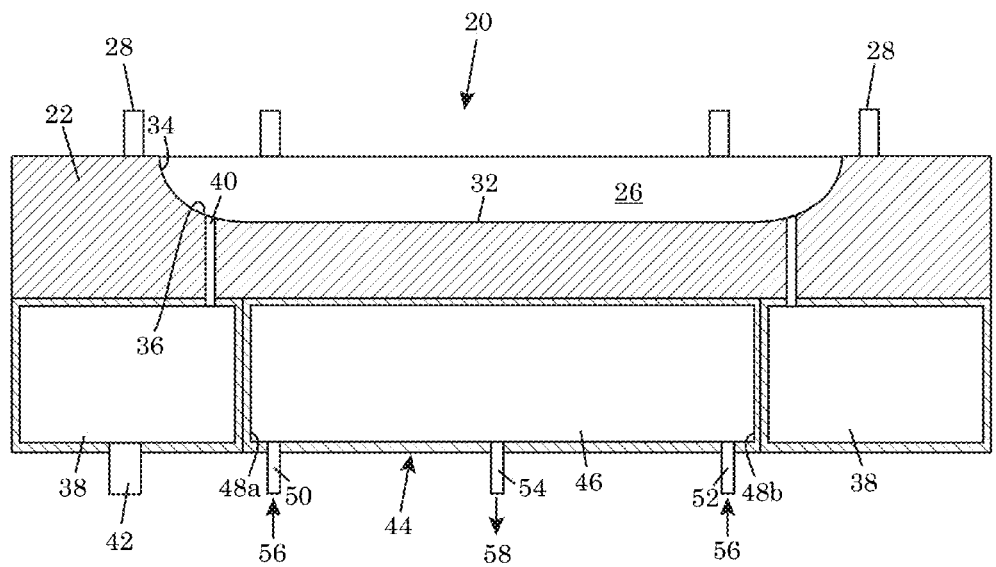
FIG. 6 is a cross-sectional view of the mold of FIG. 5.

FIG. 6 shows a vacuum plenum 38 located underneath the mold surface curved area 34. The vacuum plenum 38 could be formed in the mold body 22 or could be provided in a separate body that is bolted or otherwise attached to the bottom of the mold body 22. In one embodiment, vacuum openings 40 are formed in the mold surface curved area 34 and extend from the mold surface curved area 34, through the mold body 22, to the vacuum plenum 38. The vacuum openings 40 may extend straight down or may extend at an angle to the vacuum plenum 38. For example, the vacuum openings 40 may extend to the vacuum plenum 38 in a direction generally normal to the mold surface curved area 34.

In particular embodiments, as shown in FIG. 5, the vacuum openings 40 are located in the bends 36 and corners 37 and may be very close to the periphery 33 of the mold surface flat area 32, e.g., within 5 mm of the periphery 33 of the mold surface flat area 32. The vacuum openings 40 may be slots or holes or a combination of slots and holes. Slots have the advantage of allowing continuous and high vacuum flow over a wider area of the mold surface curved area 34. Typically, the vacuum openings 40 will have a small width or diameter, e.g., on the order of 1 mm. However, the number, size, and arrangement of the vacuum openings 40 are not restricted to what is shown in FIG. 5 or discussed above and may be optimized to achieve the desired vacuum distribution across the mold surface curved area 34.

Returning to FIG. 6, a vacuum pump can be connected to the vacuum plenum 38, e.g., through a port 42, and operated to create vacuum pressure at the mold surface curved area 34, or more particularly at the bend area of the mold surface curved area 34, where the vacuum openings 40 are located. The resulting vacuum force can be used to pull a glass sheet that is on the mold 20 or sagging into the mold cavity 26 against the mold surface curved area 34 in order to conform the glass sheet to the mold.

A cooling device 44 is provided for actively cooling the mold surface flat area 32. By active cooling, it is meant that the parameters of the cooling device are controlled and adjusted to maintain the mold surface flat area 32 a predetermined thermal profile at the mold surface flat area 32. In one embodiment, the cooling device 44 includes a cooling chamber 46 formed underneath the mold surface flat area 32. The cooling chamber 46 may be formed in the mold body 22 or in a separate body that is bolted or otherwise attached to the bottom of the mold body 22. The arrangement of the cooling chamber 46 is such that the opposite ends 48a, 48b of the cooling chamber 46 are generally aligned with the periphery of the mold surface flat area 32. In particular embodiments, the cooling chamber 46 does not extend to underneath the mold surface curved area 34 so that the active cooling is substantially restricted to the mold surface flat area 32. The cooling device 44 include ports 50, 52, 54 connected to the cooling chamber 46. In one embodiment, the ports 50, 52 are inlet ports and are located near the opposite ends 48a, 48b of the cooling chamber 46. In one embodiment, the port 54 is an outlet port and is located generally midway between the opposite ends 48a, 48b of the cooling chamber 46.

Cooling fluid 56 is supplied into the cooling chamber 46 through the ports 50, 52. In some embodiments, the cooling fluid is an inert gas such as nitrogen, helium, or argon. Air can also be used as a cooling fluid, but in some embodiments may not be used due to its oxidizing properties at high temperature. The fluid entering the ports 50, 52 will impinge on the wall of the cooling chamber 46 at locations close to the periphery of the mold surface flat area 32. The impinging fluid will then move towards the center of the cooling chamber 46, carrying with it the heat absorbed near the periphery of the mold surface flat area 32. Finally, the cooling fluid will exit the cooling chamber 46 through the outlet port 54, as shown at 58.

The cooling device 44 works to equalize temperature distribution across the mold surface flat area 32. If the periphery of the mold surface flat area 32 is hotter than the center of the mold surface flat area 32, the cooling device 44 will move heat from the periphery of the mold surface flat area 32 to the center of the mold surface flat area 32, thereby decreasing the thermal gradient across the mold surface flat area 32. In some embodiments, the action of the cooling device 44 results in a maximum thermal gradient across the mold surface flat area 32 that is less than 20° C. In particular embodiments, the action of the cooling device 44 results in a maximum thermal gradient across the mold surface flat area 32 that is less than 15° C. In addition to working to equalize the temperature distribution across the mold surface flat area 32, the cooling device 44 can be operated to maintain the temperature across the mold surface flat area 32 in a desired temperature range while the temperature in other areas of the mold surface 30, such as at the mold surface curved area 34, is in a different temperature range. The pressure and flow rate of the cooling fluid entering the inlet ports 50, 52 are used to control how much heat is removed from the mold surface flat area 32 by the cooling device 44. The pressure and flow rate may respond to the outputs of temperature monitoring elements, such as thermocouples, mounted near the mold surface flat area 32.

Figure 7:
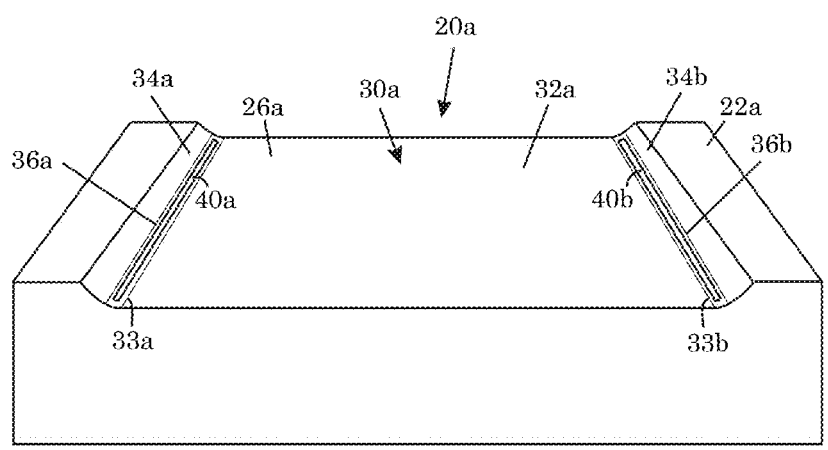
FIG. 7 shows a mold for forming the glass article of FIG. 3.

FIG. 7 shows a mold 20a for forming the shaped glass article 10a (in FIG. 3). The main differences between the mold 20a and the mold 20 (in FIG. 5) are in the particular details of the mold surface and placement of vacuum plenums. In FIG. 5, a mold surface 30a defines a mold cavity 26a within a mold body 22a. The mold surface 30a has a mold surface flat area 32a for forming the flat section 12a (in FIG. 3) of the shaped glass article and curved mold surface areas 34a, 34b for forming the curved sections 14a, 14b (in FIG. 3) of the shaped glass article. The curved mold surface areas 34a, 34b are located on opposite edges 33a, 33b of the mold surface flat area 32a and include bends 36a, 36b where they intersect with the mold surface flat area 32a. The bend angles and bend radiuses of the bends will be dictated by the bend angles and bend radiuses of the bends of the shaped glass article.

Figure 8:
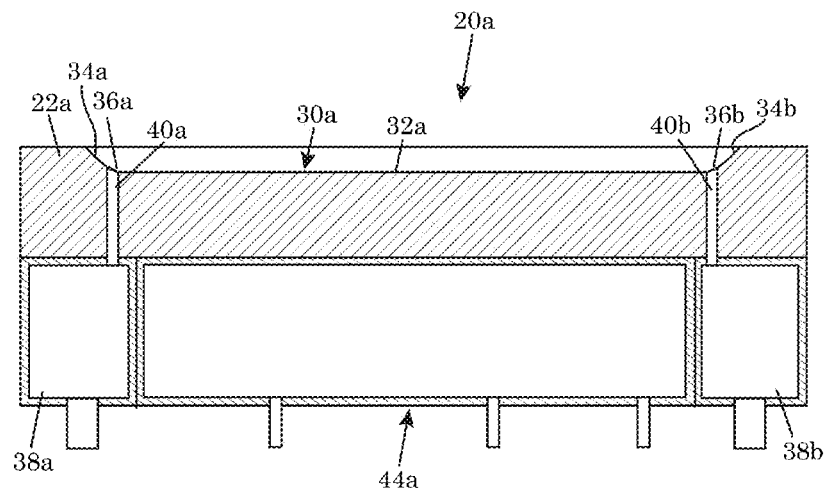
FIG. 8 is a cross-sectional view of the mold of FIG. 7.

In FIG. 8, vacuum plenums 38a, 38b are arranged underneath the mold surface curved areas 34a, 34b. The vacuum plenums 38a, 38b could be formed in the mold body 22a or provided as separate bodies that are attached to the mold body 22a. Vacuum openings 40a, 40b located in the mold surface curved areas 34a, 34b extend from the mold surface curved areas 34a, 34b, through the mold body 22a, to the vacuum plenums 38a, 38b. The vacuum openings 40a, 40b may extend straight down to the vacuum plenums 38a, 38b or may be slanted. In particular embodiments, the vacuum openings 40a, 40b are located in the bends 36a, 36b and may be very close to the opposite edges 33a, 33b (in FIG. 7) of the mold surface flat area 32a. The vacuum openings and plenums allow generation of vacuum force that can be used to conform a glass sheet to the mold surface curved areas 34a, 34b. It should be noted that conforming the glass sheet to the mold surface curved areas 34a, 34b will also result in conforming the glass sheet to the mold surface flat area 32a. Also in FIG. 8, a cooling device 44a is located underneath the mold surface flat area 32a for active cooling of the mold surface flat area 32a. The cooling device 44a works similarly to the cooling device 44 (in FIG. 6) described above.

Figure 9:
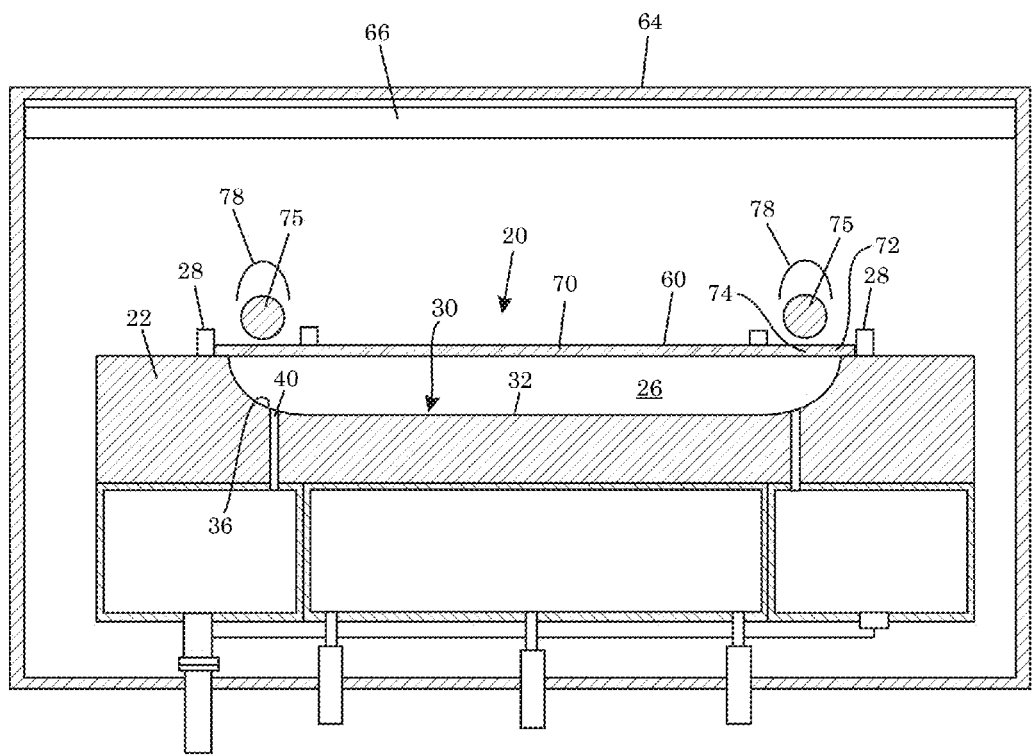
FIG. 9 is a setup for forming a shaped glass article.

FIG. 9 shows a setup for forming the shaped glass article 10 (in FIG. 1) using the mold 20 (in FIG. 5). The setup includes a glass sheet 60 placed on the mold 20 such that the glass sheet 60 is above the mold cavity 26. The mold 20 and glass sheet 60 are arranged inside a furnace 64. A furnace heater assembly includes one or more primary heaters 66 provided inside the furnace 64 to heat the glass sheet 60 and mold 20. The primary heaters 66 can be any heaters suitable for use in process chambers where rapid heating to high temperature with low contamination is necessary. In particular embodiments, the primary heaters 66 are radiant heaters and are arranged above the mold 20, e.g., near the roof of the furnace 64. Radiation from the primary heaters 66 will be directed towards the glass sheet 60 on the mold 20. Some of the radiation will be absorbed by the glass sheet 60, and some of the radiation will pass through the glass sheet 60 to the mold surface 30. In particular embodiments, the glass sheet 60 has high absorption in the medium infrared range and the primary heaters 66 are medium-wave infrared heaters with peak wavelength where the glass sheet has high absorption. For example, the medium wave infrared heaters may have peak wavelength in a range from 2.0 to 2.7 µm.

The glass sheet 60 has a glass flat area 70, which after shaping with the mold 20 will become the glass article flat section 12 (in FIG. 1), and a glass curve area 72, which after shaping with the mold 20 will become the glass article curved section 14 (in FIG. 1). The glass curve area 72 includes a glass bend area 74, which after shaping with the mold 20 will include the bends 16 (in FIG. 1) and corners 17 (in FIG. 1) of the glass article. An auxiliary heater assembly includes one or more auxiliary heaters 75, which are arranged above the mold 20 to locally heat the glass curve area 72 (or more specifically the glass bend area 74) to a glass viscosity that is different from that of the remainder of the glass sheet 60, e.g., the glass flat area 70. The area of the mold 20 below the glass curve area 72, or glass bend area 74, will also be locally heated as the radiation passes through the glass curve area 72 to the mold surface 30.

The auxiliary heaters 75 can be any heaters suitable for use in process chambers where rapid heating to high temperature with low contamination is necessary. For all types of auxiliary heaters, the heater temperature is in a range from 1000 to 1450° C. In particular embodiments, the auxiliary heaters 75 are radiant heaters. In one embodiment, the auxiliary heaters 75 are medium-wave infrared heaters with peak wavelength where the glass sheet 60 has high absorption. The heater type can be KANTHAL® iron-chromium-aluminum alloy wire or tungsten coils in quartz tube, silicon carbide heating element, or other type of small form factor resistive heating element.

The auxiliary heater assembly can further include reflectors 78, e.g., mirrors, for focusing heat from the auxiliary heaters 75 towards the mold surface curved area 34. When the glass sheet 60 is in place on the mold 20, the reflectors 78 will be opposite the local area of the glass sheet to be heated and will increase the efficiency of heating the local area by focusing the radiation from the auxiliary heaters 75 to the local area. The reflectors 78 may also be effective in shielding the glass areas that are not to be locally heated, such as the glass flat area 72, from the radiation of the auxiliary heaters 75. A suitable radiant heater for any of the auxiliary heaters 75 is QRC® infrared emitter with nano-reflector from Heraeus Noblelight. In the case of the QRC® infrared emitter, the reflector is part of the quartz tube enclosing the filament.

Figure 10:
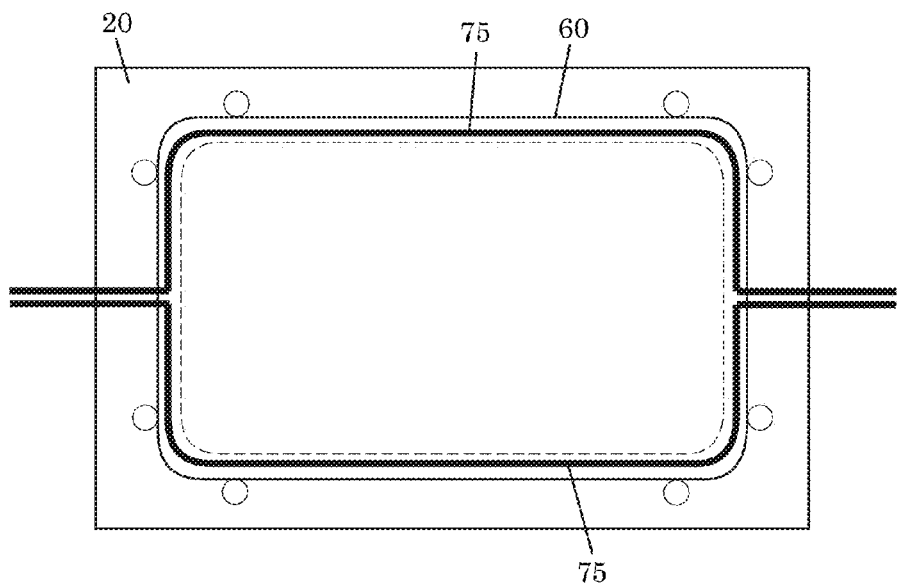
FIG. 10 shows a loop auxiliary heater arrangement.

The auxiliary heaters 75 are arranged in close proximity to the glass area to be locally heated. In particular embodiments, the auxiliary heaters 75 are arranged at a height of less than 10 mm above the glass area to be locally heated. Where the auxiliary heaters 75 are radiant heaters, the size of the auxiliary heaters 75 are selected such that the radiation they emit is substantially confined to the glass area to be locally heated. Typically, the diameter or width of the auxiliary heaters 75 will be less than 25 mm. In some embodiments, the auxiliary heaters 75 are arranged to form a shape that follows the contour of the glass area to be locally heated, which would also serve to substantially confine the radiation from the auxiliary heaters 75 to the glass area to be locally heated. FIG. 10 shows a loop arrangement of auxiliary heaters 75 that tracks the contour of the glass sheet 60 and mold 20 in the curved or bend area. This arrangement can be used to make the glass article 10 in FIG. 1 that has a curved or bend section in a loop shape.

To make the shaped glass article 10, the glass sheet 60 and mold 20 are heated inside the furnace 64 using the primary heaters 66. As the glass sheet 60 and mold 20 approach the temperatures where the glass sheet 60 can be conformed to the mold 20, typically after 1-3 minutes of heating with the primary heaters 66, the auxiliary heaters 75 are turned on. Once the glass sheet 60 and mold surface 30 have reached the desired temperatures, vacuum is applied to conform the glass curve area 72 to the mold surface curved area 34. Conforming the glass curve area 72 to the mold surface curved area 34 includes conforming the glass bend area 74 to the bends and corners of the mold surface. Also, by pulling the glass to the bends and corners of the mold, the glass flat area 70 will also be pulled against the mold surface flat area 32, thereby fully conforming the glass to the mold surface 30. The auxiliary heaters 75 are turned on before vacuum is applied because the auxiliary heaters 75 need time to warm up. The warm up time will depend on the heater type. For example, tungsten heaters have a shorter warm up time than KANTHAL® heaters. Typically, the warm up time will be in a range from 5 to 60 seconds.

The glass sheet 60 may sag into the mold cavity 26 and the glass flat area 70 may contact the mold surface flat area 32 before vacuum is applied to conform the glass curve area 72 to the mold surface curved area 34. To prevent undesirable interaction between the mold surface flat area 32 and the glass flat area 70, the glass flat area 70 is kept relatively cold, e.g., at a glass viscosity between $10^{10.1}$ poise and $10^9$ poise, while the glass flat area 70 is in contact with the mold surface flat area 32. Active cooling of the mold surface flat area 32 can be used to control the temperature of the glass flat area 70 once the glass flat area 70 touches the mold surface flat area 32. Active cooling can start before the auxiliary heaters 75 are turned on, i.e., in case the glass flat area 70 touches the mold surface flat area 32 before the glass sheet 60 and mold surface 30 have reached the desired temperatures where vacuum can be applied. In particular embodiments, the cooling device 44, which is used in active cooling of the mold surface flat area 32, starts operating as soon as the glass sheet 60 and mold 20 are loaded into the furnace 64. In some embodiments, the cooling device 44 operates such that the thermal gradient across the mold surface flat area 32 is below 20° C. In particular embodiments, the cooling device 44 operates such that the thermal gradient across the mold surface flat area 32 is below 15° C.

In one or more embodiments, the local heating and cooling of the glass sheet 60 is such that the glass viscosity in the glass bend area 74 is 8 poise or more lower than the glass viscosity in the glass flat area 70 at the time that vacuum is applied to conform the glass sheet mold 60 to the mold surface 70. In particular embodiments, at the time that vacuum is applied to conform the glass sheet 60 to the mold surface 30, the following conditions are true: (1) the glass viscosity of the glass flat area 70 is at or above $10^{10.1}$ poise, (2) the mold surface flat area 32 is at a temperature below $T_{11.3}$, where $T_{11.3}$ is the temperature at which the glass viscosity is $10^{11.3}$ poise, (3) the glass viscosity in the glass bend area 74 is at or below $10^{9.9}$ poise, (4) the mold surface curved area 36 or the portion of the mold surface curved area 36 including the bends and corners is at a temperature above $T_{11.7}$, where $T_{11.7}$ is the temperature at which the glass viscosity is $10^{11.7}$ poise. The term "glass viscosity" is based on the glass composition of the glass sheet 60. The actual values of the temperatures recited above will thus vary from one glass composition to another.

In particular embodiments, vacuum is applied in multiple stages. In a first stage, the applied vacuum is sufficient to conform the glass sheet 60 to the mold surface 30 in the bend area. For a second stage, the applied vacuum is reduced to a level that is just sufficient to hold the glass sheet 60 against the mold surface 30 in the bend area. For example, the vacuum pressure may be above 20 kPa for the first stage and may be reduced below 10 kPa for the second stage. The first stage will have a shorter duration than the second stage. For example, the first stage may have a duration of less than 20 seconds, while the second stage may have a duration of 40 or more seconds. The multi-stage vacuum allows the glass to settle at lower vacuum level, which is less damaging to mold life and glass cosmetics. Additional step downs in vacuum may be added as needed to create the best balance between the force needed to hold the glass against the mold and the mold life. Also, multi-stage vacuum with repeated heating and cooling of the bend area can be used to relieve stress and reduce snap back. Stress relief and reduction in snap back can also be achieved by holding vacuum while cooling the glass on the mold. However, in some embodiments, this may not be done because the glass surface can become damaged as it is being held by vacuum against the mold while it is contracting during cooling.

After the glass sheet has been conformed to the mold, the resulting shaped glass article is allowed to cool to a glass viscosity above $10^{13}$ poise while still in the mold. Then, the cooled shaped glass article is removed from the mold. Any number of processes may be carried out after separating the shaped glass article from the mold, such as chemical strengthening of the shaped glass article by ion-exchange.

Above, it was discussed that the glass sheet and mold were first heated using the primary heaters 66, followed by local heating of the glass using the auxiliary heaters 75. Both of these heatings took place in the same furnace 64. In alternate embodiments, it is possible for these heatings to take place in separate furnaces or multiple zones in a continuous furnace. The heating by the primary heaters 66 can take place in a first furnace or first set of heating zones in a continuous furnace, after which the glass sheet and mold can be transported to a second furnace or a second set of furnace zones where the local heating of the glass will take place in order to conform the glass sheet to the mold surface in the bend area. If the auxiliary heaters 75 are left on in the second furnace or second set of furnace zones, there will be no need for a heater warm up time before vacuum can be applied to conform the glass to the mold surface. This alternate embodiment may be used to increase throughput in a continuous manufacturing setup. The number of furnace zones in manufacturing depends on the desired throughput. Auxiliary heaters can also be arranged in non-consecutive furnaces so that the bend areas of the glass and mold can be alternately heated and cooled during a multi-stage vacuum process as mentioned above.

Figure 11:
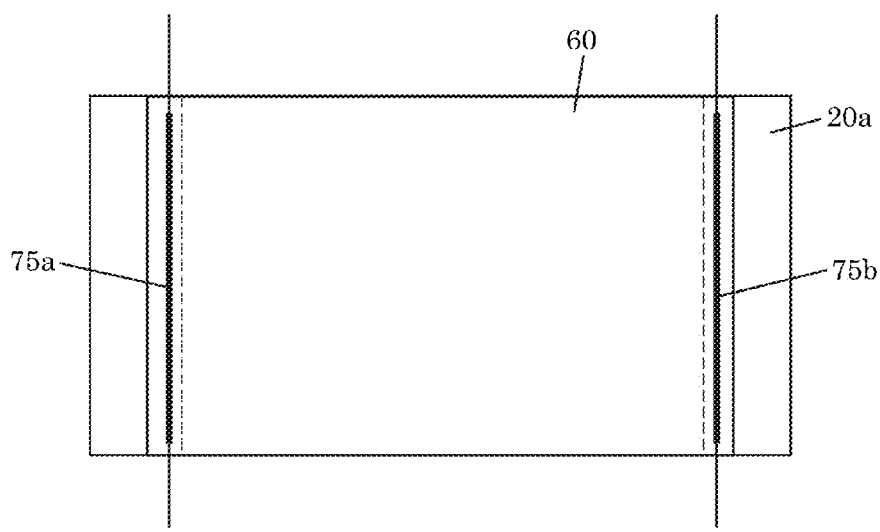
FIG. 11 shows a linear auxiliary heater arrangement.

The method described above can also be used to make the shaped glass article 10a in FIG. 3, except that the setup of FIG. 9 will need to be slightly modified. To form the shaped glass article 10a, the mold 20 in the setup of FIG. 9 can be replaced with the mold 20a of FIG. 7. Also, the arrangement and configuration of the auxiliary heaters 75 can be replaced with the one shown in FIG. 11. In FIG. 11, a parallel arrangement of long auxiliary heaters 75a can be used to locally heat the bend areas of the glass sheet and mold surface. Conditions (1)-(4) mentioned above will apply at the time that vacuum is used to conform the glass sheet to the mold. In the case of the shaped glass article 10a, condition (3) will apply to both bend areas of the glass sheet and condition (4) will apply to both bend areas of the mold.

A shaped glass article having a 3D shape is formed using the method described above. The shaped glass article has a flat area and at least one bend area. In one embodiment, the shaped glass article is configured for use as a cover glass article for an electronic device having a flat display.

In one embodiment, the flat area of the shaped glass article is flat to within 100 μm over a 25 mm×25 mm area, as measured by a Tropel® FlatMaster® surface measurement tool available from Corning Incorporated. The flatness is measured as a comparative height difference between a reference plane and the flat area of the shaped glass article. "Flat to within 100 μm" means that any variations in the height difference between the reference plane and the flat area is within 100 μm.

The surface texture of the shaped glass article can be characterized by two parameters: surface roughness and waviness. Roughness is a measure of the finely spaced surface irregularities. Waviness is a measure of surface irregularities with a spacing greater than that of surface roughness.

In one embodiment, at least one of the surfaces of the shaped glass article has a roughness average (Ra) of less than 1 nm. In another embodiment, at least one of the surfaces of the shaped glass article has a roughness average of less than 0.7 nm. In yet another embodiment, at least one of the surfaces of the shaped glass article has a roughness average of less than 0.3 nm.

In one embodiment, the surfaces of the shaped glass article each have a waviness height less than 30 nm over a 15 mm by 25 mm 3D area, as measured by a Zygo® Newview 3D optical surface profiler. The waviness height is the peak to valley distance of the surface profile. The spacing between the surface irregularities measured is typically in a range from 3 to 5 mm.

In one embodiment, the bend area of the shaped glass article has a bend radius less than 10 mm. The small bend radius is possible using a combination of active cooling of the mold and/or localized heating of the bend area of the glass sheet and conforming the glass sheet by applying vacuum through slot(s) or opening(s) in the bend area and corners of the mold, as described in one or more embodiments above.

In one embodiment, the wall thickness of the shaped glass article is in a range from 0.3 mm to 3 mm. In one embodiment, the wall thickness is uniform, e.g., variation in the wall thickness of the shaped glass article is within 100 μm.

In one embodiment, the shaped glass article is transparent and has an optical transmission greater than 85% in a wavelength range of 400 nm to 800 nm.

In one embodiment, the shaped glass article has a compression strength greater than 300 MPa and a hardness greater than 7 on the Mohs scale. In one embodiment, the shaped glass article has at least one surface compressively-stressed region and a depth of layer of the compressively-stressed region is at least 25 μm. The compression strength and/or compressively-stressed region can be achieved by subjecting the shaped glass article to a strengthening process, which may be chemical or thermal. In some embodiments, the compression strength and/or compressively-stressed region is achieved by subjecting the shaped glass article to an ion-exchange process.

In one embodiment, the shaped glass article is made from an alkali aluminosilicate glass composition comprising from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+CaO≤10 mol %. This glass composition and others may be found in U.S. Pat. No. 8,158,543 (Dejneka et al., "Fining Agents for Silicate Glasses").

In another embodiment, the shaped glass article is made from an alkali-aluminosilicate glass composition comprising at least about 50 mol % $SiO_2$ and at least about 11 mol % $Na_2O$, and the compressive stress is at least about 900 MPa. In some embodiments, the glass composition further comprises $Al_2O_3$ and at least one of $B_2O_3$, $K_2O$, MgO and ZnO, wherein $-340+27.1 \cdot Al_2O_3 - 28.7 \cdot B_2O_3 + 15.6 \cdot Na_2O-$ 61.4.K$_2$O+8.1.(MgO+ZnO)≥0 mol %. In particular embodiments, the glass composition comprises from about 7 mol % to about 26 mol % Al$_2$O$_3$; from 0 mol % to about 9 mol % B$_2$O$_3$; from about 11 mol % to about 25 mol % Na$_2$O; from 0 mol % to about 2.5 mol % K$_2$O; from 0 mol % to about 8.5 mol % MgO; and from 0 mol % to about 1.5 mol % CaO. These glass compositions and others may be found in U.S. Publication No. 2013/0004758 (Dejneka et al., "Ion Exchangeable Glass with High Compressive Stress,") filed Jul. 1, 2011, the content of which is incorporated herein by reference in its entirety.

Example 1

Figure 12:
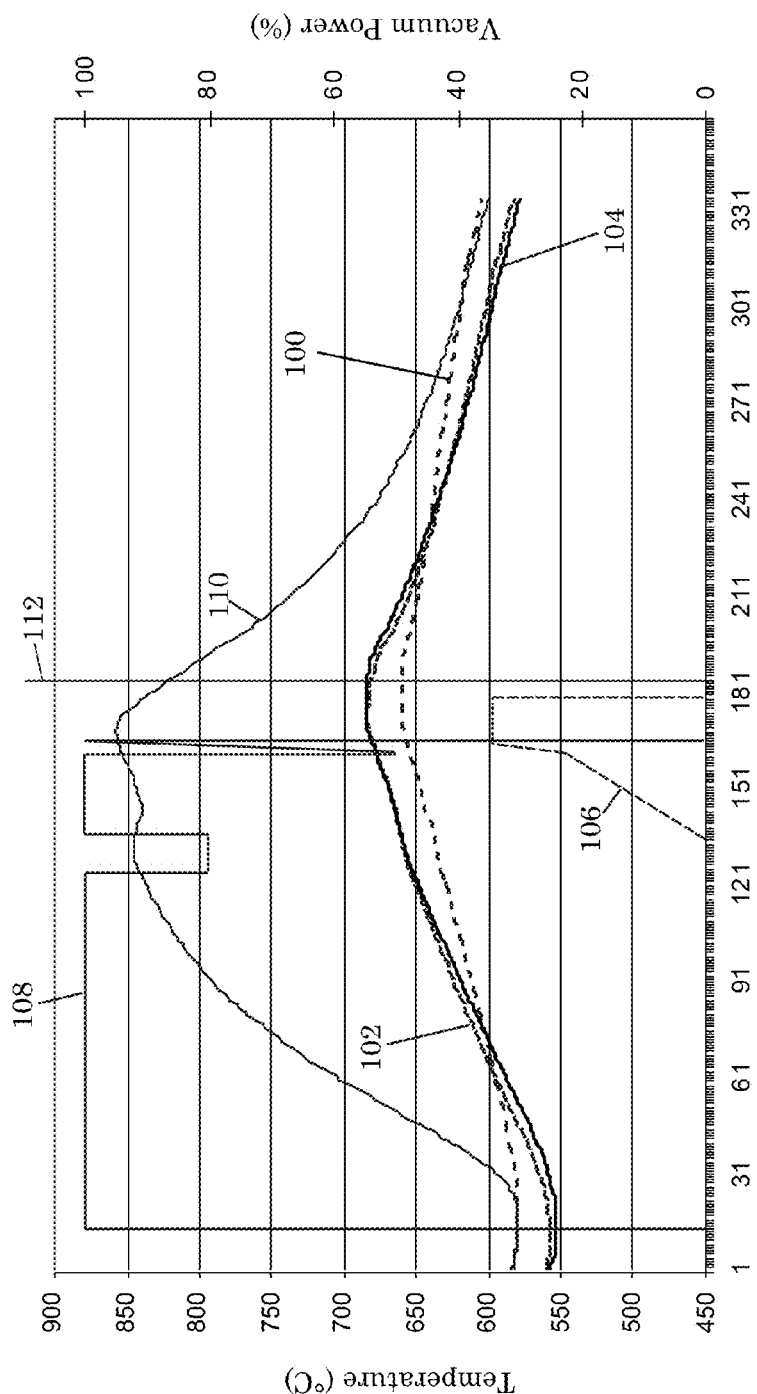
FIG. 12 shows temperature and vacuum profiles during a process of forming a shaped glass article without active cooling of the mold surface flat area.

A shaped glass article was formed using a mold with a dish-shaped mold cavity. The forming process included local heating of the bend area without active cooling of the mold surface flat area. Various profiles characterizing the process are shown in FIG. 12. The thermal profile at the center of the mold surface flat area is shown at 100. The thermal profile at a bend on the mold surface curved area is shown at 102. The thermal profile at a corner on the mold surface curved area is shown at 104. The vacuum profile is shown at 106. The furnace power profile is shown at 108. The furnace temperature profile is shown at 110. The time at which the furnace was opened is indicated at 112. The temperature difference between the mold surface flat area (represented by thermal profile 100) and the mold surface curved area (represented by thermal profile 102 or 104) is relatively small. The temperature difference between the mold surface flat area and the mold surface curve area peaks at about 25° C. when vacuum is applied.

Example 2

Figure 13:
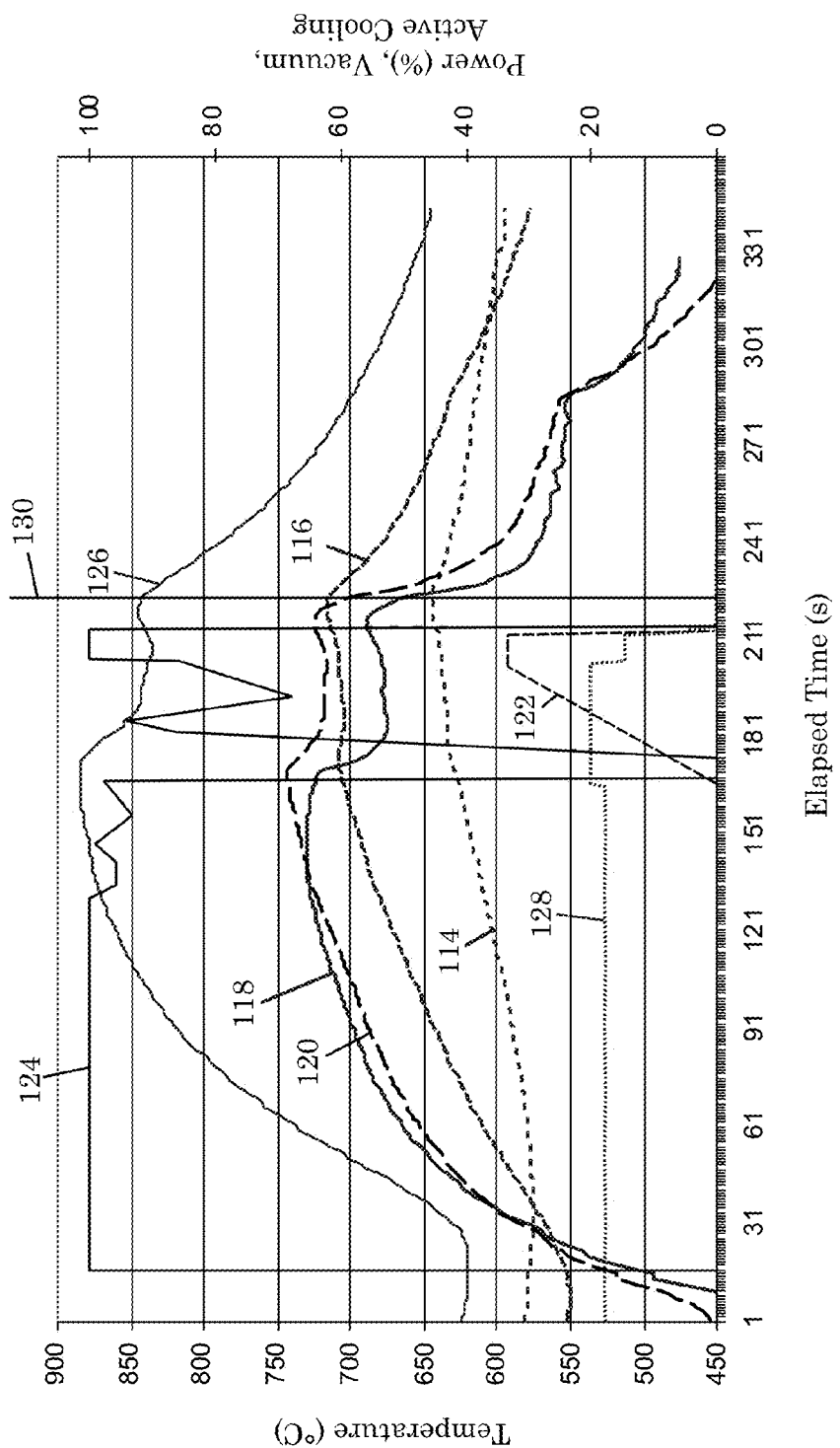
FIG. 13 shows temperature and vacuum profiles during a process of forming a shaped glass article with active cooling of the mold surface flat area.

A shaped glass article was formed using a mold with a dish-shaped mold cavity. The forming process include local heating of the bend area with active cooling of the mold surface flat area. Various profiles characterizing the process are shown in FIG. 13. The thermal profile at the center of the mold surface flat area is shown at 114. The thermal profile at a point on the mold surface curve area is shown at 116. The thermal profile at the center of the glass flat section is shown at 118. The thermal profile at a point on the glass curved section is shown at 120. The vacuum profile is shown at 122. The furnace power profile is shown at 124. The furnace temperature profile is shown at 126. The active cooling profile is shown at 128. Nitrogen was used as the cooling fluid. The time at which the furnace was opened is indicated at 130. The temperature difference between the mold surface flat area (represented by thermal profile 114) and the mold surface curved area (represented by thermal profile 116) peaks at about 80° C. when vacuum is applied. This shows that active cooling is effective in keeping the mold surface flat area relatively cold while the mold surface curved area or bend area is being locally heated.

Example 3

Figure 14:
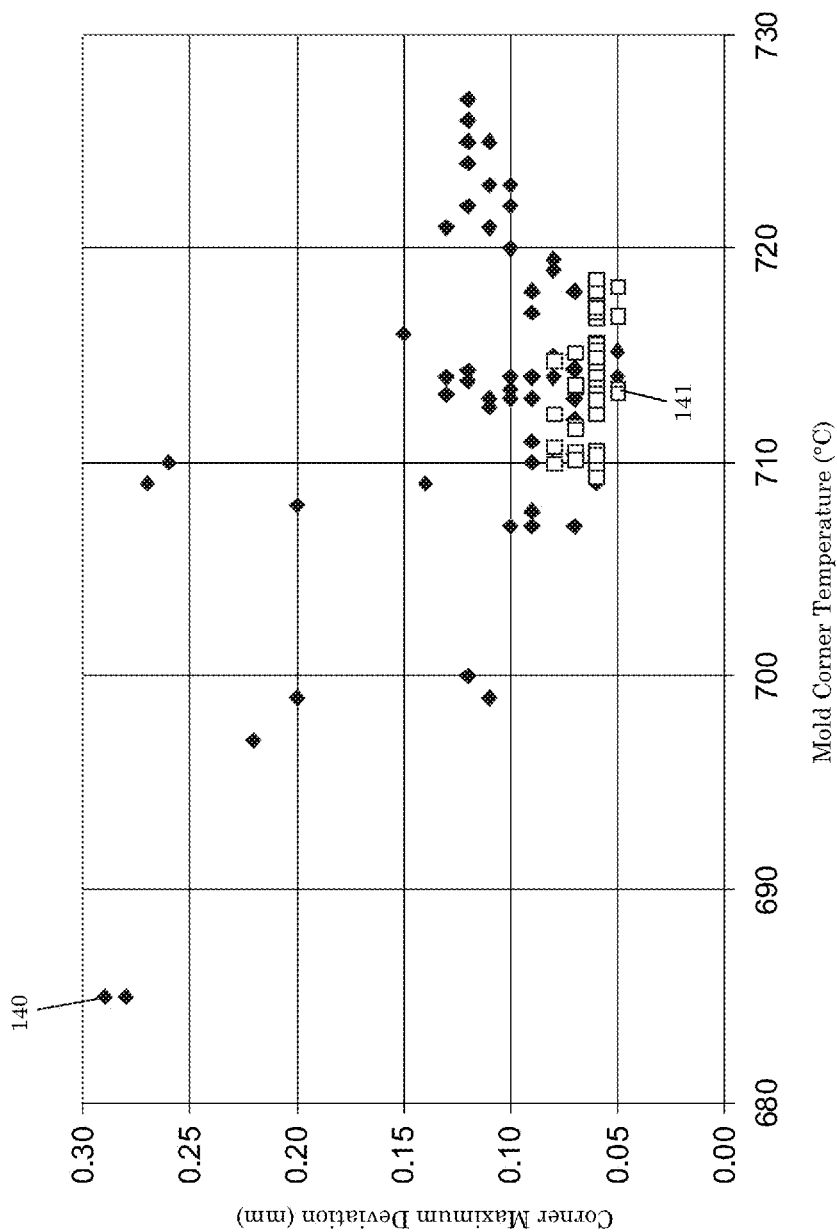
FIG. 14 is a plot of corner deviation of a shaped glass article from an ideal shape as a function of mold corner temperature.

Various dish-shaped glass articles were formed using a mold with a dish-shaped mold cavity. Local heating of the mold surface area and active cooling of the mold surface flat area were employed in the process. The glass articles were made from Code 2317 GORILLA® glass available from Corning Incorporated. The glass sheets used in making the glass articles had a thickness of 0.8 mm. The dish shape had a bend radius of 10 mm. The effect of mold corner temperature on corner deviation of the formed shape from the ideal shape was investigated by varying the temperature in the mold surface bend area. The results are shown in FIG. 14. In FIG. 14, the diamond markers 140 represent DOE ("design of experiments") data and the square markers 141 represent the final process data. The data shows that increased mold bend temperature resulted in reduced deviation from ideal shape, thus demonstrating the importance of increasing edge and corner temperatures. For the particular glass composition and dish shape investigated, the corner deviations exceed 0.1 mm if the corner temperature of the mold is below about 710° C. In this case, the deviations are high because the mold surface bend area is too cold to allow the bend radius to be achieved. On the other hand, if the corner temperature of the mold is too high, the corner deviation of the formed shape worsens because the glass flat area distorts and the distorted glass flat area causes the glass corners to have high deviation as the glass corners are pulled away from the mold corners by the distortion.

Example 4

A dish-shaped glass article was made using a mold with a dish-shaped mold cavity. Local heating of the mold surface bend area and active cooling of the mold surface flat area were employed in the process. FIG. 15A shows the points 150-158 monitored on the mold during the process of forming the shaped glass article. FIG. 15B shows the thermal profiles at the points indicated in FIG. 15A. The same reference numbers are used for the points and thermal profiles to make it easier to map the points on the mold to the thermal profiles. The thermal profile 164 represents the temperature at the side of the mold, approximately 0.5 inches below the mold surface. The furnace power profile is shown at 160. The vacuum profile is shown at 162.

FIG. 15B shows that active cooling can flatten out the thermal gradients in the mold surface flat area (represented by thermal profiles 150, 152) while there are still very high temperature differences between the mold surface flat area (represented by thermal profiles 150, 152) and the mold surface curved area (represented by thermal profiles 154, 156, 158). FIG. 15B also shows that active cooling can reduce the temperature near the edges of the mold surface flat area (represented by thermal profile 152) so that the temperature distribution across the mold surface flat area is more uniform even as the mold surface curved area is being locally heated. The temperature gradient in the mold surface flat area remained below 15° C. while the glass sheet was on the mold.

Example 5

Figures 16A, 16B:
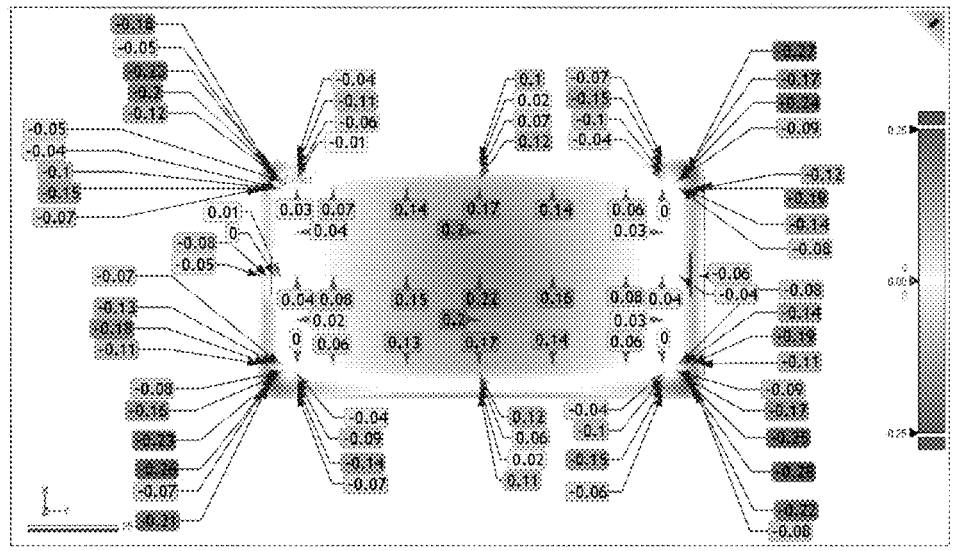
FIG. 16A shows deviations from an ideal shape of a dish-shaped glass article formed without active cooling of the mold.
FIG. 16B shows deviations from an ideal shape of a dish-shaped glass article formed with active cooling of the mold.

FIGS. 16A and 16B show deviations from the ideal shape for dish-shaped glass articles made without and with active cooling of the flat area of the mold, respectively. Without active cooling (FIG. 16A), the corners are not formed properly and deviations significantly exceed the ±0.1 mm target. With active cooling (FIG. 16B), the shape is well within ±0.1 mm target.

Example 6

Figure 17:
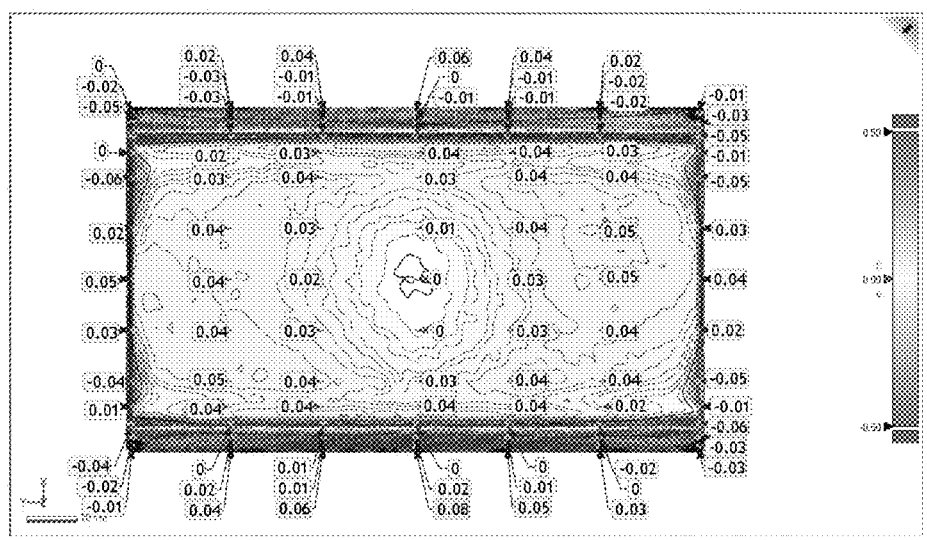
FIG. 17 shows deviations from an ideal shape of a sled-shaped glass article formed with active cooling of the mold.

FIG. 17 shows the deviations of a sled-shaped glass article formed using localized heating in the bend area with active cooling in the flat area. The article has a bend radius of 6 mm and overall dimensions of 120 mm by 70 mm by 3 mm and a glass thickness of 0.7 mm. The absolute deviation from the ideal shape is less than 100 μm.

Example 7

Table 1 below shows glass temperatures and difference between glass and mold temperatures during two separate processes of forming a dish-shaped glass article with a bend radius of 10 mm from a glass sheet. In Process No. 1, the dish-shaped glass article was formed without active cooling of the mold and without localized heating of the glass sheet in the bend area. In Process No. 2, the dish-shaped glass article was formed with active cooling of the mold and/or localized heating of the glass sheet in the bend area as described in this disclosure. Both processes involved vacuum conforming by applying vacuum via slot(s) or opening(s) located in the bend area and corners of the mold.

TABLE 1

| Process No. | Location on Glass | Glass Temp. at the start of applying vacuum (° C.) | Log glass viscosity (poise) | Difference between glass and mold temperatures (° C.) |
|---|---|---|---|---|
| 1 | Flat area | 790–806 | 8.4–8.1 | 160–200 |
|   | Bend area | 800–816 | 8.2–7.9 |   |
| 2 | Flat area | 720–730 | 10–9.7 | <100 |
|   | Bend area | 770–790 | 8.8–8.4 |   |

Example 8

Impact of glass temperature/viscosity on "orange peel" was investigated. The investigation involved forming a first dish-shaped glass article from a first glass sheet without active cooling of the flat area and with localized heating of the bend area and forming a second dish-shaped glass article from a second glass sheet with active cooling of the flat area and/or localized heating of the bend area. With active cooling and/or localized heating of the bend area, the glass viscosity at the flat area can be above a level that may cause glass reboil, which can generate "orange peel." With active cooling and/or localized heating of the bend area, it was found that the glass viscosity at the flat area can be kept 1.5 orders of magnitude higher compared to without active cooling and localized heating. The higher glass viscosity in the flat area allowed for approximately 10 times improvement in peak to valley of surface roughness. In one specific example, both surfaces of a glass article made according to Process No. 2 of Example 7, i.e., with active cooling and/or localized heating, each had a waviness height of less than 30 nm over a 15 mm by 25 mm area, as measured by Zygo® Newview 3D optical surface profiler. In comparison, both surfaces of a glass article made according to Process No. 1 of Example 7, i.e., without active cooling and localized heating, has a waviness height of 200 nm over the same measurement area.

Example 9

A dish-shaped glass article formed according to this disclosure, i.e., with active cooling of mold and/or localized heating of glass sheet in the bend area and vacuum conforming of the glass sheet to the mold, was compared to a dish-shaped glass article formed by pressing a glass sheet between two molds. It was found that with pressing, small mold errors can create an over-constrained condition that results in non-uniform strain across the formed article and distortion in the flat area of the formed article. The type of non-uniform strain and distortion observed with pressing was not observed with the vacuum conforming process. In the vacuum conforming process, there is only one mold. Further, the flat glass area is stretched uniformly over the mold by applying vacuum through the slot(s) near the bend area.

The invention claimed is:

1. A method of forming a shaped glass article, comprising:
   placing a glass sheet on a mold having a mold surface with a select shaped glass article profile, the placing being such that a first glass area of the glass sheet corresponds to a first mold surface area of the mold surface, wherein the first mold surface area is substantially flat, and a second glass area of the glass sheet corresponds to a second mold surface area of the mold surface, wherein the second mold surface area comprises a bend;
   heating the first glass area and the second glass area to a glass viscosity between $10^{10.1}$ poise and $10^9$ poise;
   locally heating the second glass area to a glass viscosity at or below $10^{9.9}$ poise such that the glass viscosity of the second glass area is 8 poise or more lower than the glass viscosity of the first glass area;
   applying a force to the glass sheet by creating vacuum at the second glass area through at least one vacuum opening located in the bend to conform the glass sheet to the mold surface when the second glass area is at a glass viscosity at or below $10^{9.9}$ poise; and
   locally cooling the first mold surface area using a cooling chamber positioned underneath the first mold surface area so that it does not extend underneath the bend to induce a thermal gradient on the mold surface that results in the glass viscosity in the first glass area remaining above $10^{9.9}$ poise during the local heating of the second glass area.

2. The method of claim 1, wherein the local cooling of the first mold surface area is such that the glass viscosity in the first glass area is maintained at or above $10^{10.9}$ poise during at least a portion of the local heating of the second glass area.

3. The method of claim 1, wherein local cooling of the first mold surface area results in a maximum thermal gradient across the first mold surface area of less than 20° C. during the local cooling.

4. The method of claim 3, wherein local cooling of the first mold surface area is such that a temperature of the first mold surface area is below a temperature corresponding to a glass viscosity of $10^{11.3}$ poise.

5. The method of claim 1, wherein a temperature of the second mold surface area is above a temperature corresponding to a glass viscosity of $10^{11.7}$ poise when the force is applied to the glass sheet.

6. The method of claim 1, wherein the bend has a radius less than 20 mm.

7. The method of claim 1, wherein creating vacuum comprises creating vacuum with a first vacuum pressure for a first time period followed by creating vacuum with a second vacuum pressure for a second time period, wherein the second vacuum pressure is reduced compared to the first vacuum pressure.

8. The method of claim 1, further comprising cooling the conformed glass sheet to a glass viscosity above $10^{13}$ poise.

9. The method of claim 1, wherein heating of the first glass area and second glass area to a glass viscosity at or above $10^{10.1}$ poise occurs in a first furnace or a first set of furnace zones and local heating of the second glass area to a glass viscosity at or below $10^{9.9}$ poise occurs in a second furnace or second set of furnace zones that is different from the first furnace or first set of furnace zones.

10. The method of claim 1, wherein at least one vacuum opening is located only in the bend.

* * * * *